United States Patent
Venkat et al.

(10) Patent No.: US 10,353,640 B2
(45) Date of Patent: Jul. 16, 2019

(54) SEAMLESS DATA MIGRATION IN A CLUSTERED ENVIRONMENT

(71) Applicant: Dell Products L.P., Round Rock, TX (US)

(72) Inventors: Prakash Venkat, Bangalore (IN); Gopakumar Ambat, Bangalore (IN); G. Paul Koning, New Boston, NH (US); Ryan J. Thomas, Plymouth, MN (US); Raghuram Bilugu, Shakopee, MN (US); Daniel R. Oelke, Elk River, MN (US)

(73) Assignee: Dell Products L.P., Round Rock, TX (US)

( * ) Notice: Subject to any disclaimer, the term of this patent is extended or adjusted under 35 U.S.C. 154(b) by 370 days.

(21) Appl. No.: 15/370,932

(22) Filed: Dec. 6, 2016

(65) Prior Publication Data

US 2018/0157429 A1 Jun. 7, 2018

(51) Int. Cl.
*G06F 11/00* (2006.01)
*G06F 3/06* (2006.01)

(52) U.S. Cl.
CPC ............ *G06F 3/0689* (2013.01); *G06F 3/061* (2013.01); *G06F 3/0647* (2013.01)

(58) Field of Classification Search
CPC .... G06F 9/4856; G06F 11/203; G06F 3/0617; G06F 3/0647; G06F 3/67; G06F 3/65
See application file for complete search history.

(56) References Cited

U.S. PATENT DOCUMENTS

| | | | | |
|---|---|---|---|---|
| 6,018,810 A * | 1/2000 | Olarig | ................ | G06F 11/2007 710/307 |
| 7,730,489 B1 * | 6/2010 | Duvur | ..................... | G06F 9/466 714/2 |
| 7,769,722 B1 * | 8/2010 | Bergant | ................ | G06F 16/184 707/681 |
| 7,805,583 B1 * | 9/2010 | Todd | ..................... | G06F 3/0617 711/161 |
| 7,843,906 B1 * | 11/2010 | Chidambaram | .... | H04L 47/6205 370/386 |
| 8,700,570 B1 * | 4/2014 | Marathe | .............. | G06F 16/1824 707/634 |
| 9,043,567 B1 * | 5/2015 | Modukuri | ............... | G06F 16/00 711/162 |
| 9,304,889 B1 * | 4/2016 | Chen | ................... | G06F 11/3452 |

(Continued)

*Primary Examiner* — Bryce P Bonzo
*Assistant Examiner* — Jeison C Arcos
(74) *Attorney, Agent, or Firm* — Jackson Walker L.L.P.

(57) ABSTRACT

A data management method and system for migrating a data volume from a source array to a destination array includes receiving an indication of a source volume to migrate from the source array to the destination array wherein the source volume comprises a clustered volume associated with a plurality of cluster hosts. A path-flip is performed by the host multipath module, to switch the paths between source and destination array. This switch is done in a seamless manner, without disrupting host I/O. The path-flip includes transferring associated metadata from source to destination and can be performed even in clustered and/or multi-host environments. Sanity timers are built-in to ensure that the path-flip completes within a stipulated time-frame and, if not, the path-flip process is aborted and I/O is resumed without any disruption.

17 Claims, 9 Drawing Sheets

(56) References Cited

U.S. PATENT DOCUMENTS

| | | | |
|---|---|---|---|
| 2002/0103663 A1* | 8/2002 | Bankier | G06Q 20/00 709/224 |
| 2005/0038849 A1* | 2/2005 | Kaluskar | G06F 16/27 709/203 |
| 2005/0066128 A1* | 3/2005 | Yagisawa | G06F 3/0607 711/114 |
| 2005/0125557 A1* | 6/2005 | Vasudevan | G06F 11/2038 709/239 |
| 2005/0182992 A1* | 8/2005 | Land | G06F 3/0607 714/701 |
| 2006/0015773 A1* | 1/2006 | Singh | G06F 11/2028 714/13 |
| 2006/0047909 A1* | 3/2006 | Takahashi | G06F 3/0605 711/114 |
| 2006/0236048 A1* | 10/2006 | Deguchi | G06F 11/2069 711/162 |
| 2007/0016754 A1* | 1/2007 | Testardi | G06F 3/0611 711/206 |
| 2007/0136389 A1* | 6/2007 | Bergant | G06F 11/1435 |
| 2008/0162754 A1* | 7/2008 | Ogawa | G06F 3/0613 710/74 |
| 2009/0204743 A1* | 8/2009 | Inoue | G06F 11/201 711/100 |
| 2010/0325345 A1* | 12/2010 | Ohno | G06F 11/108 711/103 |
| 2011/0231686 A1* | 9/2011 | Fujii | G06F 1/3203 713/324 |
| 2012/0246430 A1* | 9/2012 | Takahashi | G06F 3/0605 711/162 |
| 2012/0303913 A1* | 11/2012 | Kathmann | G06F 3/0607 711/162 |
| 2013/0198562 A1* | 8/2013 | Anthonisamy | G06F 11/2005 714/6.21 |
| 2014/0040409 A1* | 2/2014 | McDowell | G06F 16/11 709/212 |
| 2014/0040410 A1* | 2/2014 | McDowell | G06F 3/0617 709/212 |
| 2015/0378759 A1* | 12/2015 | Pershin | G06F 9/45558 718/1 |
| 2016/0004720 A1* | 1/2016 | Tabaaloute | H04L 67/1095 707/639 |
| 2016/0224259 A1* | 8/2016 | Ahrens | G06F 3/0619 |
| 2016/0234304 A1* | 8/2016 | Hirose | H04L 67/1097 |
| 2017/0228388 A1* | 8/2017 | Venkat | G06F 3/0604 |

* cited by examiner

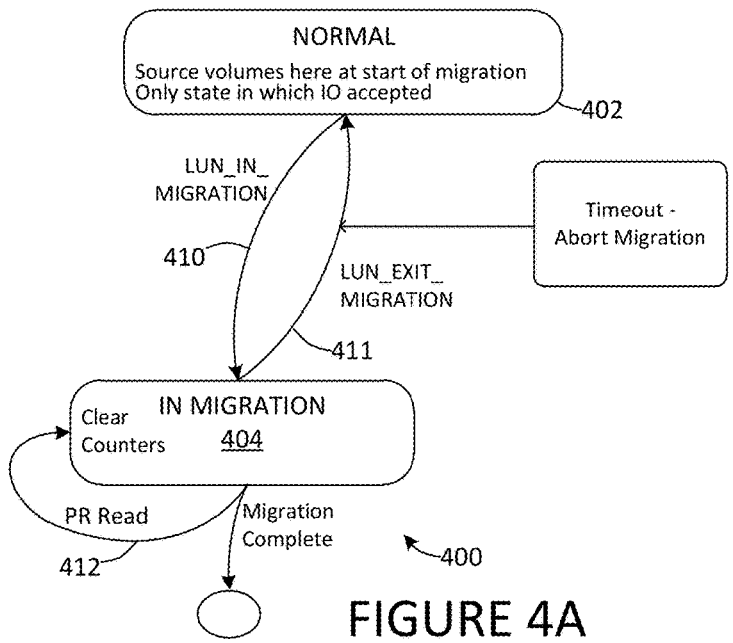
FIGURE 4A
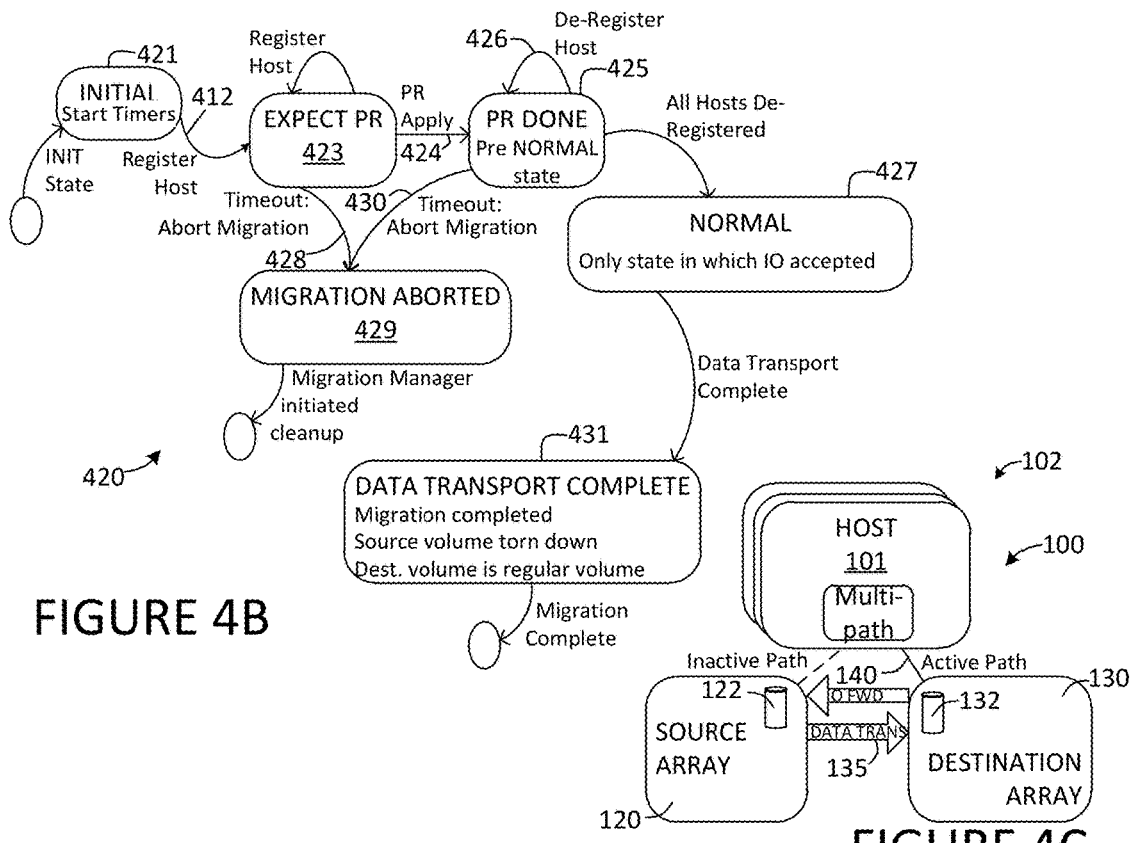
FIGURE 4B
FIGURE 4C

SEAMLESS DATA MIGRATION IN A CLUSTERED ENVIRONMENT

TECHNICAL FIELD

The present disclosure generally relates to data storage, and, more particularly, migration of data among data storage devices and systems.

BACKGROUND

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

An information handling system can be configured in several different configurations ranging from a single, stand-alone computer system to a distributed, multi-device computer system, to a networked computer system with remote or cloud storage systems.

Entities that maintain large and frequently accessed storage systems will readily appreciate that, because it is sometimes necessary or desirable to migrate data from one or more "source" storage devices to one or more "destination" storage devices, the ability to migrate data efficiently is important. In at least some data storage environments, an important characteristic of efficient data migration is the extent to which the data migration tasks halts, slows, or otherwise disrupts workload input/output (I/O) operations. As an example of a disruption commonly encountered with existing migration techniques, a migration process that requires manual reconfiguration of the workload application has a negative impact man Data migration that has little or no impact on workload I/O may be referred to as "seamless" data migration.

SUMMARY

One commercially significant type of data migration, sometimes referred to herein as heterogeneous data migration, involves migration of data between storage devices, also referred to herein as storage arrays, that differ from one another in one or more characteristics. As one example, migrating data from a first array that executes firmware and/or an operating system from a first provider to a second array that executes firmware and/or an operating system from a second provider may be considered a heterogeneous migration. As a second example, applicable to storage systems that employ an iSCSI protocol, migrating data from a first array that maintains a one-to-one correspondence between iSCSI targets and logical unit numbers (LUNs), also referred to herein as storage volumes, to a second array that employs or supports one-to-many relationship between iSCSI targets and storage volumes.

Migration tasks, whether heterogeneous or otherwise, may include migration of data from storage arrays, referred to herein as clustered storage arrays, that are registered or otherwise associated with two or more host information handling systems or, more simply, hosts. Data migration is generally more complex in clustered environments.

Seamless migration preferably integrates exception handling to recover from migration attempts that fail and/or time out unexpectedly as well as migration attempts canceled by user request.

Disclosed embodiments eliminate or substantially reduce disruptions attributable to manual reconfiguration. In at least one embodiment, a storage manager conducts a seamless, heterogeneous migration of one or more storage volumes in a clustered environment.

The storage manager may leverage host and/or storage array resources while monitoring and controlling the progress of the migration. Resources leveraged by the storage manager may include, as non-limiting examples, a data transport resource and a multipath resource.

The data transport resource may be configured to enable workload I/O to continue while a source volume is copied to a destination volume. The multipath resource may correspond to a host resource configured to redirect, without disrupting, workload I/O by modifying the workload application to employ a path to the destination volume as the application's active path.

Embodiments of disclosed subject matter may incorporate support for a small number of vendor-specific SCSI commands, to support seamless migration between any two arrays coupled by a data transport resource or another suitable data transport mechanism.

Although subject matter disclosed herein may include descriptions pertaining to a specific migration task, the described functions and features are applicable in other embodiments. For example, at least some exemplary embodiments of seamless migration between heterogeneous storage arrays are described with respect to a migration of a data volume from a source array comprising a Dell/EqualLogic storage array, also referred to within the industry as a PS Series storage array or, more simply a PS array, to a destination array comprising a Dell/Compellent storage array, sometimes referred within the industry as a Storage Center Array or, more simply, an SC array.

Example source arrays may include iSCSI arrays employing 1 Gb/sec or 10 Gb/sec Ethernet controllers. Source arrays may combine solid state drives and magnetic drives within a single chassis. Frequently accessed and/or recently accessed data may be stored or replicated in the generally faster solid state drives while lower priority data may be stored in more cost effective magnetic storage. Two or more storage arrays may be included within a storage group to achieve potentially enormous storage groups, e.g., >>100 TB. The individual storage arrays in a storage group may employ different RAID schemes.

In at least one embodiment, the destination array is a storage area network (SAN) array that implements its own operating system, referred to herein as the destination array operating system. The destination array operating system may include native support for a number of virtualized storage management applications, including automated tiered storage, thin provisioning, continuous snapshots, and array-to-array replication. The destination array operating system may track various storage metadata including frequency of access, logical volume, disk drive type, stored data type, and RAID level. The destination array may store and manage large data blocks on a granular level, e.g., automatically assigning some blocks to high-performance drives and other blocks to large-capacity drives. The destination array may include support for Fiber Channel (FC) and iSCSI server/host interfaces and may include solid state drives as well as FC, serial-attached SCSI, and, serial attached ATA (SATA) disk drives.

Disclosed embodiments support migration in multi-host cluster environments and enable applications to revert back to the original source in the event of a failure or timeout during the path-flip process. Embodiments also handle cases of "split brain" to prevent data corruption in multi-host multiple hosts.

In accordance with disclosed subject matter, a data management method and system for migrating a data volume from a source array to a destination array include receiving an indication of a source volume to migrate from the source array to the destination array wherein the source volume comprises a clustered volume associated with a plurality of cluster hosts, initiating a path-flip process comprising. The path-flip process may include configuring each cluster host to suspend I/O operations, responsive to detecting an exception before each host suspends I/O successfully, instructing each cluster host to release I/O and terminating the migration process, thereby restoring the source volume as the active volume.

If each host suspends I/O successfully, the source volume is disabled. Responsive to detecting an exception before the volume disable completes, a volume enable may be sent to the source array, instructing each cluster host to release I/O and terminating the migration process. The method may further include instructing each of the cluster hosts to perform registration copy operations to apply source volume host registrations to the destination volume and responsive to detecting an exception before the registration copy operations complete, sending a volume enable to the source volume, instructing each cluster host to release I/O, and terminating the migration process. The method may still further include sending a volume enable to the destination volume and responsive to detecting a destination volume status of enabled from each of the plurality of hosts, copying the source volume to the destination volume.

In some embodiments, detecting an exception includes detecting a timeout event, a command failure, or a migration cancellation request. A path-flip timer may be initiated before instructing each of the cluster hosts to execute the hold I/O command wherein detecting the timeout event includes detecting the path-flip timer exceeding a threshold value before completing the path flip process.

An abort timer may be initiated after instructing each host to stop sending I/O to storage, wherein detecting the timeout event includes detecting the abort timer exceeding a threshold value before completing the path flip process.

Embodiment include support for canceling a migration request, in which case the a reverse path-flip sequence may be performed with the roles of the source volume and target volume reversed or substantially reversed. Responsive to detecting a time out or failure during the reverse path-flip, terminate reverse path flip and resume the copying.

Configuring each host to suspend I/O may include instructing at least one host to execute a vendor-specific host migration register command. In other embodiments, vendor specific commands may be omitted or substantially omitted, wherein configuring each host to suspend I/O may include issuing hold I/O instructions to each host.

Disabling the source volume may include sending a SCSI disable command while, in other embodiments, disabling the source volume includes sending a vendor-specific LUN in migration command from each host to the source volume.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following FIGUREs and detailed written description.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and unless indicated otherwise, all drawings are in accordance with the present invention wherein:

FIG. 4A is a state transition diagram of a source volume during a migration disclosed herein;

FIG. 4B is a state transition diagram of a target volume during a migration disclosed herein;

FIG. 4C illustrates a block diagram representing the system of FIG. 1 at an interim point of a data migration process;

DETAILED DESCRIPTION

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter. The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

Figure 1:
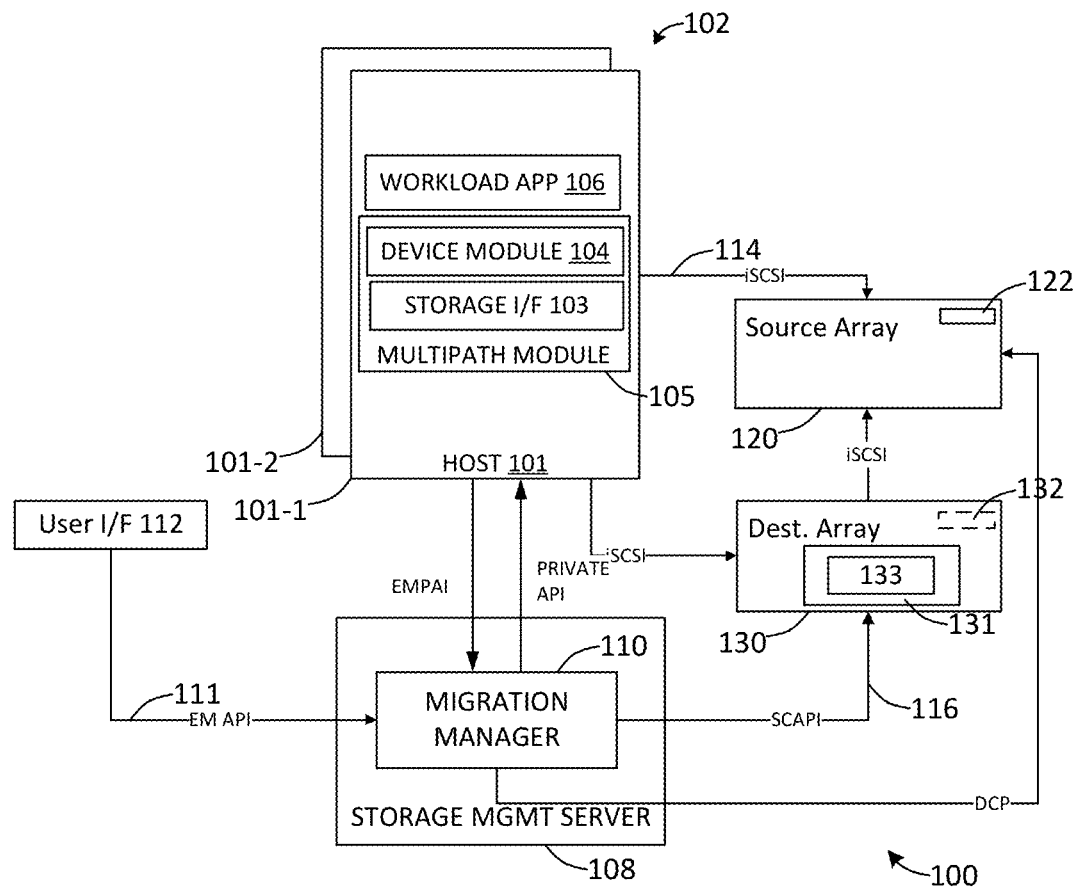
FIG. 1 illustrates a block diagram of an information handling system for performing data migration.

FIG. 1 illustrates elements of an information handling platform 100 that implements and supports seamless heterogeneous data migration in a clustered environment. The information handling platform 100 illustrated in FIG. 1 includes two or more host information handling systems 101, also referred to herein simply as hosts 101, two of which are illustrated in FIG. 1 as host 101-1 and host 101-2. The hosts 101 illustrated in FIG. 1 represent a host cluster 102. The hosts 101 in host cluster 102 may share access to storage resources including source volume 122 prior to migration and the destination volume after a successfully completed migration.

The hosts 101 illustrated in FIG. 1 are coupled to a server or other information handling system referred to herein as storage management server 108 and a heterogeneous pair of SAN storage arrays including a source array 120, e.g., a PS-series storage array, and a destination array 130, e.g., an SC-series storage array.

Each host 101 may include one or more processors (not depicted) and computer readable storage accessible to the processors. The computer readable storage may include stored processor-executable instructions including I/O support instructions that when executed by the processor(s), cause migration manager 110 to perform seamless migration operations as described herein.

FIG. 1 illustrates storage management instructions including a storage interface driver 103, a device specific module 104 or, more simply, device module 104, and a workload application 106. Storage interface driver 103 may provide a framework that operates in conjunction with hardware-specific information provided by device module 104 to provide an I/O module, referred to herein as multipath module 105, that facilitates connectivity with source array 120. In at least some embodiments, multipath module 105 provides features including automatic connection management, automatic path failure detection and failover to a functioning path, automatic load balancing across paths, support for multiple connections to the source volume, and support for a variety of I/O initiators. Because the multiple storage volume connections or paths that multipath module 105 supports are leveraged in seamless heterogeneous migration described herein, multipath module 105 is also sometimes referred to herein as multipath module 105. Multipath module 105 may include multipath resources integrated within the host operating system. An example of such a resource is the multipath I/O (MPIO) support integrated into Windows Server 2008 and other server-class operating systems from Microsoft.

The storage management server 108 illustrated in FIG. 1 includes one or more processors (not depicted) and a computer readable storage medium accessible to the processor(s) for storing processor-executable storage management instructions. The storage management instructions illustrated in FIG. 1 includes a migration manager 110. In at least one embodiment, migration manager 110 is configured to control a seamless heterogeneous migration of a data volume referred to herein as source volume 122 from source array 120 to a destination volume, referred to herein as destination volume 132 on destination array 130. Migration manager 110 may expose or otherwise support a storage management user interface 112 enabling remote interaction by a data storage administrator or other user.

Prior to undertaking a migration task, host(s) 101 in host cluster 102 may transact workload I/O generated by workload application 106 with source array 120 via source data path 114, producing stored data in a source volume 122 of source array 120. At some point in time, information handling platform 100 initiates a migration of the data stored in source volume 122 to destination array 130, resulting in stored data stored in destination volume 132 of destination array 130, and to cause host 101 to transact workload I/O with destination array 130 via destination data path 116 after the migration completes. Although source data path 114 and destination data path 116 are both identified as iSCSI data paths in FIG. 1 for illustrative purposes, each data path may comply with any host interface protocol supported by the applicable storage array.

The seamless heterogeneous migration of data from source array 120 to destination array 130 is facilitated by data transport module 133 executing within destination array operating system 131 and multipath module 105 of the host operating system (not depicted explicitly in FIG. 1), both of which communicate with migration manager 110.

In at least one embodiment, data transport module 133 may comprise an inherent or native feature of destination array operating system 131. Data transport module 133 may include and support functionality included in the Thin Import resource of the Storage Center Operating System (SCOS) from Dell, Inc. Data transport module 133 may enable destination array 130 to import data from source array 120, while permitting workload I/O to continue during the import. Multipath module 105, executing on host 101 may be configured to export pseudo-names on top of native-device paths.

In at least one embodiment, migration manager 110, enrolls host(s) 101, source array 120, and destination array 130 within its management domain. Migration manager 108 orchestrates the migration process and provides a management user interface 112 to initiate a migration.

An example embodiment of migration manager 110 described herein includes five stages: 1) configuration, 2) setup, 3) start, 4) cleanup, and 5) cancellation (optional).

Migration Configuration.

Figure 2A:
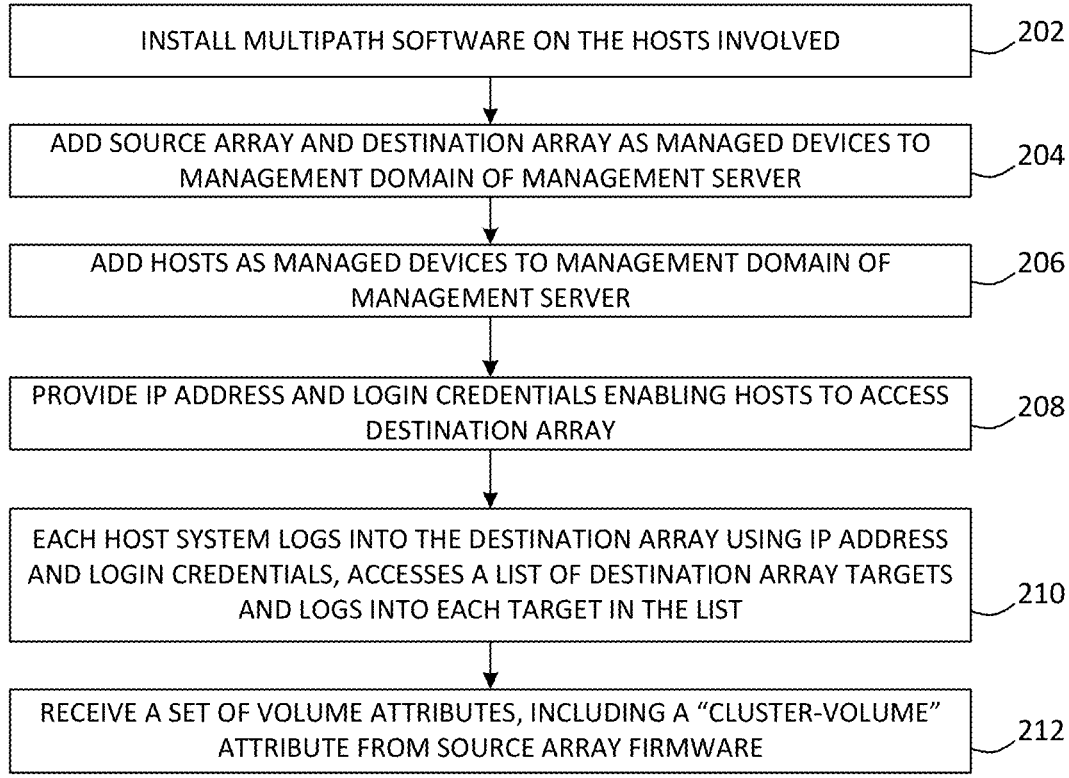
FIG. 2A is a flow diagram of a migration configuration stage.

FIG. 2A illustrates a flow diagram of a migration configuration process 200 that includes installing (block 202) necessary multipath software on each of the cluster hosts, adding (block 204) source array 120 and destination array 130 as managed devices under the management domain of storage management server 108, and adding (block 206) host(s) 101, as managed devices within the management domain of storage management server 108.

The migration configuration process 200 illustrated in FIG. 2A further includes providing (block 208) IP address and login information to enable hosts 101 to access destination array 130. Each of hosts 101 in cluster 102, including host 101-1, may then log into (block 210) or otherwise authenticate themselves to destination array 130, using the credentials received from migration manager 110. Upon successfully logging in, each host 101 in cluster 102 may access a list of destination array targets within the destination array, and log into each of destination array targets included in the list.

Firmware in source array 120 may pass (block 212) a set of volume attributes, including a cluster volume attribute, to migration manager 110. The cluster volume attribute may indicate clustered configurations, such as the cluster 102 of FIG. 1, in which multiple hosts 101 are associated with and transact I/O with source volume 122. The value or state of the cluster volume attribute may be determined, by source array firmware, based on various parameters. In at least one embodiment, parameters that influence the cluster volume attribute may include: a) a multi-initiator-access attribute that is set for any source volume that is to allow access from multiple hosts, b) a persistent registration attribute, which lists all nodes having SCSI-3 persistent registrations on a given volume, and c) active control lists information indicative of the number of active connections for the given volume.

Figure 2B:
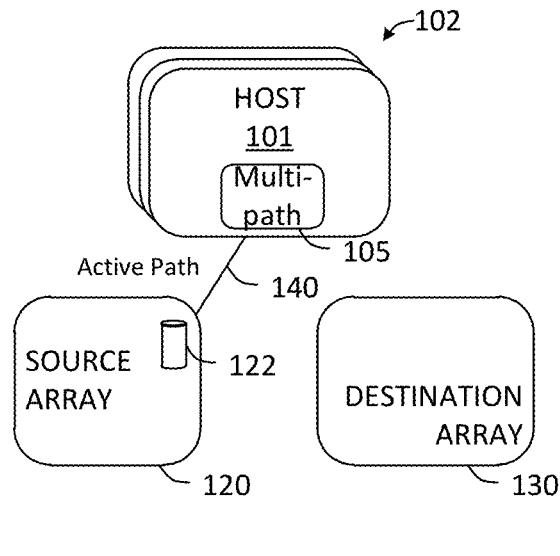
FIG. 2B illustrates a block diagram representing the system of FIG. 1 at the completion of the data migration stage of FIG. 2A.

FIG. 2B illustrates information handling platform 100 at the completion of migration configuration process 200, at which point the active I/O path 140 has not changed and is still associated with source volume 122, as it was in a pre-migration state before the migration was initiated Migration Setup.

Figure 3A:
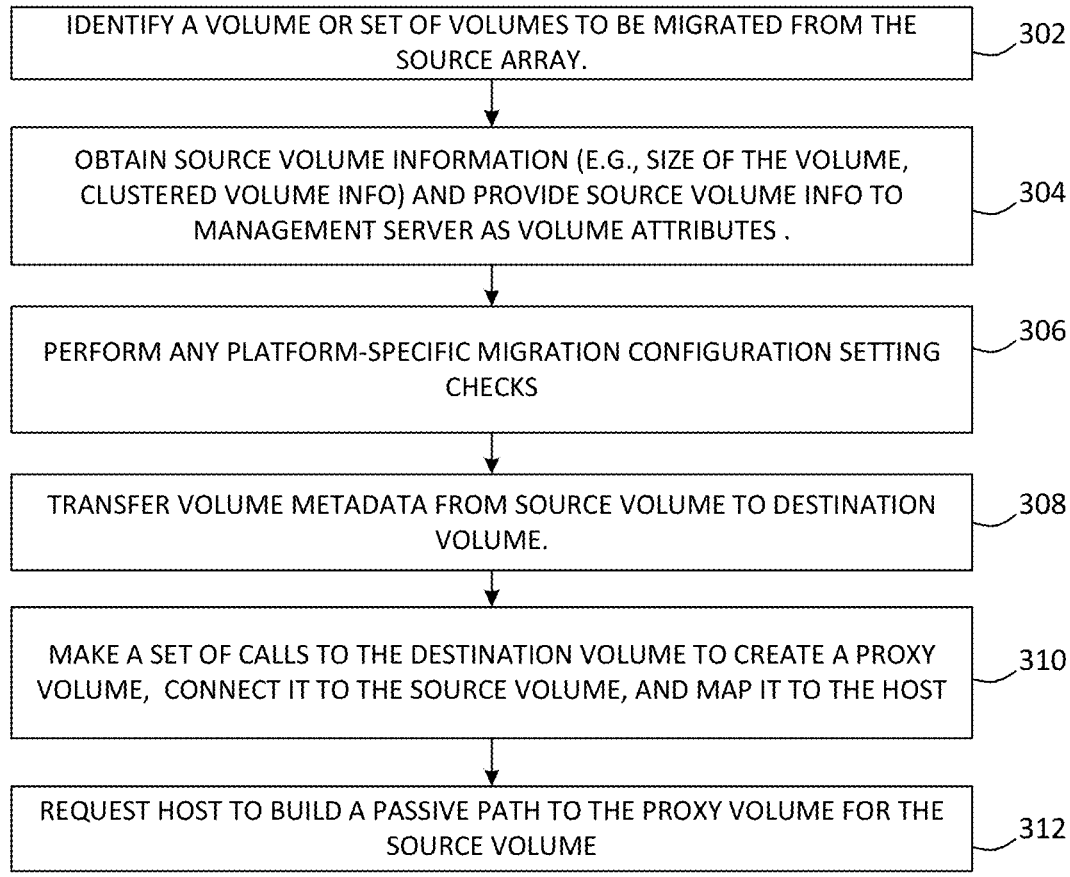
FIG. 3A is a flow diagram of a migration configuration stage.

FIG. 3A illustrates a flow diagram of a migration setup process 300 that begins when an administrator or other user identifies (block 302), via management UI 112 and migration manager 110, one or more source array volumes to be migrated. For each source volume 122 to be migrated, multipath module 105, as a part of discovery, obtains (block 304) or otherwise accesses volume attribute information for each source volume to be migrated. Volume attribute information may include a volume size attribute and a cluster attributed indicative of whether the volume is being used in a clustered environment, i.e., accessible to more than one host. All volume attribute information obtained by multipath module 105 may be forwarded to migration manager 110.

Migration manager 110 may perform (block 306) one or more additional configuration checks before proceeding, at least some of which may be specific to the applicable platform. As a non-limiting example in a Linux environment, an administrator may confirm that the active path used by multipath module 105 is the same as the volume path used by workload application 106.

In the migration setup process 300 illustrated in FIG. 3A, migration manager 110 transfers (block 308) volume metadata from source volume 122 to destination array 130. Volume metadata may include any non-SCSI layer data including, as non-limiting examples, volume name, description, snapshot schedule, and the like. Migration manager 110 may store or otherwise preserve the volume metadata information. Preserving the volume metadata may include translating it from a source volume format to a destination volume format.

The migration setup process 300 of FIG. 3A includes migration manager 110 making (block 310) a set of calls to destination array 130 to create a proxy volume 134, connect it to the source volume via connection 143, and map it to each host 101. Migration manager 110 will then have a Device-ID for destination array 130, which can be passed on to each host 101. It should be noted that, at this stage, background transport of data from source array 120 to destination array 130 has not started.

The migration setup process 300 illustrated in FIG. 3 includes migration manager 110 asking (block 312) multipath module 105 to build a passive path 142 to proxy volume 134 for source volume 122. Multipath module 105 may be required to look up a specific destination array device, which may validate the multipath module path and which may involve a rescan of the host bus. In some platforms, the rescan executes automatically while in other platforms, the host may issue an explicit rescan.

Once proxy volume 134 is visible, multipath module 105 may issue a vendor-specific command to proxy volume 134 to validate proxy volume 134 as the data transport destination of source volume 122. Multipath module 105 may then issue a DISABLE command or a vendor-specific SCSI command to proxy volume 134 to prevent proxy volume 134 from accepting any further I/O and thereby prevent any accidental writes of the volume.

After verifying proxy volume 134 as the data transport destination of source volume 122 and disabling destination volume I/O, multipath module 105 may build passive path 142 to proxy volume 134 as if passive path 142 is an additional path to source volume 122.

Figure 3B:
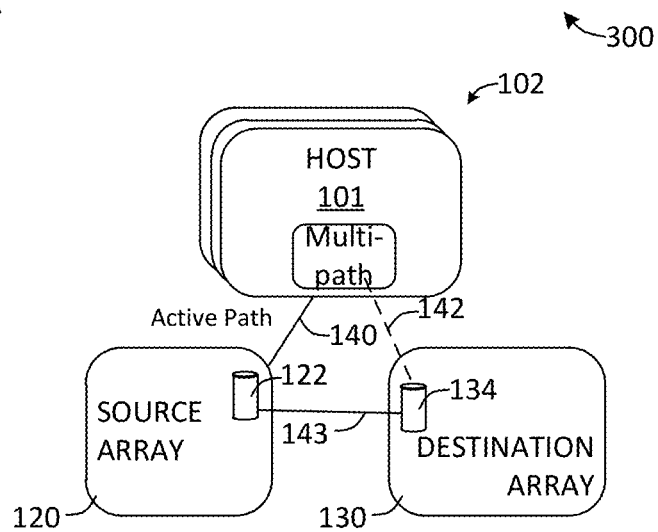
FIG. 3B illustrates a block diagram representing the system of FIG. 1 at the completion of the data migration stage of FIG. 3A.

As illustrated in FIG. 3B, at the end of Setup Migration, hosts 101 have discovered and validated proxy volume 134 and established passive path 142 to destination proxy volume 134, while workload I/O to source volume 122 may continue via active path 140. When the seamless migration process transitions from the migration setup stage of FIG. 3A and FIG. 3B to the migration start stage described below with respect to FIG. 4A and FIG. 4B, the proxy volume 134 may be referred to herein as the destination volume 132 to emphasize that, prior to the start migration stage, no destination array I/O has occurred, although proxy volume 134 has been created and confirmed as the destination array volume to which the source volume 122 will be copied during the start migration stage. However, a volume functioning as a proxy volume may also be referred to herein as a destination volume depending upon the context.

Migration Start:

The migration start stage described herein is implemented in two phases. Distinct start migration phases are used, in part, to accommodate Linux platforms, which are not configured to check for a specific SCSI additional sense code qualifier (ASC/Q). Accordingly, a multipath module 105 in a Linux platform may issue a suspend I/O before entering the second phase of the migration start stage. A two-phased migration start also facilitates clustered environment migration by explicitly identifying each of the hosts 101 involved in the migration.

Figure 6:
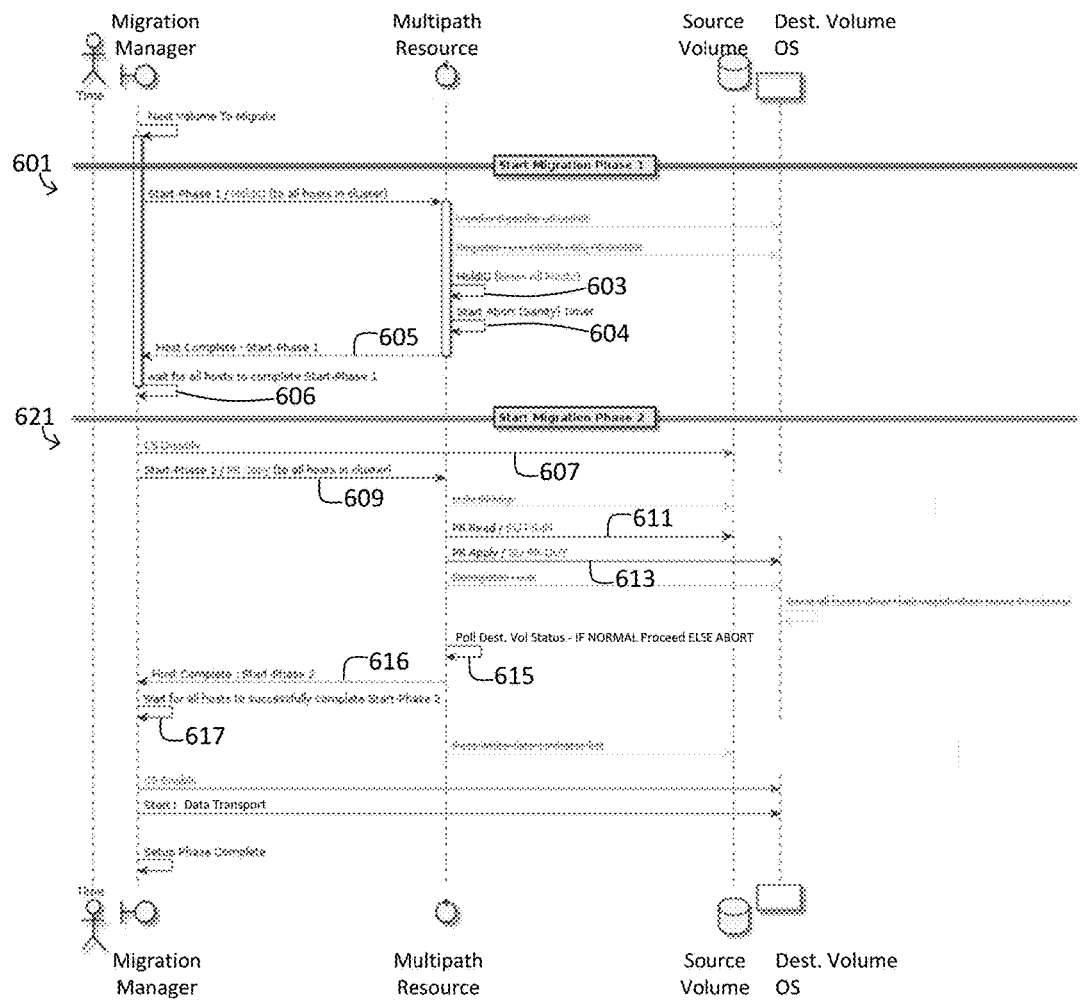
FIG. 6 illustrates stages of an alternative data migration process.

Vendor-specific and vendor-generic implementations of a start migration state are described. A vendor-specific implementation is described with respect to FIG. 4A and FIG. 4B while FIG. 6 illustrates a vendor-generic implementation. As its names suggests, the vendor-generic implementation may use fewer vendor-specific SCSI commands, but may execute more control commands during the critical "path flip" sequence.

Start Migration Phase 1:

FIG. 4A illustrates a state transition diagram 400 corresponding to source volume 122 while FIG. 4B illustrates a state transition diagram corresponding to destination volume 132. Prior to Start Migration Phase1, source volume 122 is in NORMAL state 402. In NORMAL state 402, source volume 122 may be handling workload I/O from workload application 406.

In at least one embodiment, migration manager 110 sends a PHASE1 command to each of the hosts 101 in cluster 102. Migration manager 110 may then wait to hear from each of host 101 before progressing to Phase 2.

Multipath module 105 may be configured to respond to receiving the PHASE1 command by performing Phase 1 operations. In at least one embodiment, Phase 1 operations may include multipath module 105 issuing a vendor-specific SCSI command, referred to herein as an INIT command, to place proxy volume 134 in an INITIAL state 421 of the state transition diagram 420 illustrated in FIG. 4B. Accordingly, in response to receiving an INIT command, proxy volume 134 transitions to INITIAL state 421. INIT commands received while proxy volume 134 is in INITIAL state 421, such as might occur in a multi-host or clustered environment, are treated as no-ops and cause no change of the destination volume state. In at least some embodiments, proxy volume 134 does not process I/O in INITIAL state 421. More generally, proxy volume 134 processes I/O only after it transitions to NORMAL state 427, at which point proxy volume 134 is referred to herein as destination volume 132.

The proxy volume 134 may transition from INITIAL state 421 to an EXPECT PR state 423 in response to receiving a HOST REGISTER command from multipath module 105 of a host 101. In clustered embodiments, proxy volume 132 may receive HOST REGISTER commands from each host 101 of the cluster 102. The destination volume 132 may register each host that sends a HOST REGISTER command. As depicted in FIG. 4B, a destination volume 132 in the EXPECT PR state 423 does not change state if a second or subsequent HOST REGISTER command is received.

In a Linux platform, multipath module 105 may, in lieu of HOST REGISTER commands, execute a SUSPEND I/O command to block all I/O operations from being sent to source volume 122. The SUSPEND I/O command may flush all outstanding I/O operations in the pipeline and prevent any new I/O operations from issuing. Executing the SUSPEND I/O may be necessary in Linux platforms in view of the lack of Linux support for checking for a specific SCSI ASC/Q.

Multipath module 105 may initiate a timer referred to herein as a recovery timer to recognize a timeout condition and trigger corrective action in response to a path-flip sequence that takes more than a timeout interval to complete. As illustrated in FIG. 4B, for example, expiration of the recovery timer while destination volume 132 is in the EXPECT PR state 423 triggers a transition 428 to MIGRATION ABORT state 429 associated with a migration abort sequence that, if successfully completed, results in a resumption of workload I/O to source volume 122, without having application down-time. The state transition path from EXPECT PR state 423 to MIGRATION ABORT state 429 may be referred to herein as an internal abort of the path-flip process.

At the end of PHASE1, source volume 122 is in NORMAL state 402 (FIG. 4A) and destination volume 132 is in EXPECT PR state 423 (FIG. 4B).

Phase2 of the start migration stage may begin once Phase-1 completes for all hosts. Phase 2 may be signaled by migration manager 110, e.g., by sending a PHASE2 command to each host.

In response to receiving a PHASE2 command, each host multipath module 105 may perform Phase2 operations. The Phase2 operations may include each multipath module 105 sending a vendor-specific variant of a logical volume RESET command to source volume 122. The vendor-specific logical volume RESET command may correspond to the LUN_IN_MIG 410 in FIG. 4A. The source volume 122 may be configured to accept LUN_IN_MIG 410 only if source volume 122 is in NORMAL state 402.

Upon acceptance of a LUN_IN_MIG command 410, source volume 122 may transition to IN MIGRATION state 404, abort all outstanding and any future I/O operations across all I/O initiators, and return a vendor-specific ASC/Q to the initiator of each aborted or future I/O. Significantly, the first initiator request sent to source volume 122 after source volume 122 transitions to IN MIGRATION state 404 may also abort all outstanding I/O operations across all initiators. This prevents destination volume 132 from transitioning out of EXPECT PR state 423 while PR transfer is ongoing. In at least some embodiments, the first initiator does a variant of LUN Reset to abort all outstanding I/O operations, across all initiators.

After processing LUN_IN_MIG command 410, source volume 122 may be configured to reject all incoming host I/O operations and honor only a limited set of vendor-specific SCSI commands. An exception to this rules is that I/O from white-listed initiators, including a data transport resource in the destination array 130, may be allowed.

In a clustered environment, where migration manager 110 initiates a LUN_IN_MIG command on multiple hosts at or near the same time, it is possible that a host has its source volume I/O aborted with a specific ASC/Q, while the host's multipath module 105 continues to perform a path-flip process. The host's multipath module 105 may queue any I/O for source volume 122 that fails with a specific ASC/Q, in both Windows and VMware platform, until it gets an explicit 'clearance' from destination volume 132. In Linux platform embodiments, because multipath module 105 lacks an ability to check for a particular ASC/Q, a suspend is performed during Phase1.

As depicted in FIG. 4A, processing of the LUN_IN_MIG command transitions source volume 122 to IN MIGRATION state 404. In the IN_MIGRATION state 404, many SET operations including, as non-limiting examples, RESIZE and RENAME Volume, may fail since source volume 122 is used as the reference mount path in Linux.

In Linux platform embodiments, because a suspend was performed in Phase1, there will be no new source volume I/O. In VMware and Windows, however, new source volume I/O could be queued by multipath module 105. If, instead, new source volume I/O is forwarded to source volume 122 by the host, source volume 122 may reject the I/O and return a specific ASC/Q to multipath module 105. In this case, multipath module 105 may queue the ASC/Q information.

The source volume 122 may allow a vendor-specific variant of a PR READ command while in the IN MIGRATION state 404. The PR READ command 412 may return all PR metadata, including, as examples, registration and reservation info, from all hosts involved. A source volume 122 that has no PR information may return NO PR INFORMATION or an analogous response. As illustrated in FIG. 4A, PR READ command 412 does not transition source volume 122 from IN MIGRATION state 404 as a result of servicing this command.

A vendor-specific variant of a PR APPLY command 424 (FIG. 4B) sent to destination volume 132 may be accepted by destination volume 132 when destination volume 132 is in the EXPECT PR state 423. Once destination volume 132 transitions out of Expect PR state 423, subsequent PR-Apply commands will be treated as no-ops. In at least one embodiment, an accepted PR APPLY command 424 may provide a PR metadata block to destination volume 132, where the PR metadata may be processed/applied. After a PR APPLY command is processed, destination volume 132 may transition from EXPECT PR state 423 to PR DONE state 425.

FIG. 4B further illustrates a vendor-specific deregister host command 426, e.g., HOST-MIG-DEREG, processed by destination volume 132. The destination volume 132 may clear host-specific registration information to convey that the applicable multipath module 105 has moved forward in its state machine. Destination volume 132 may remain in PR DONE state 425 until HOST-MIG-DEREG commands are received from each host and processed, at which point destination volume 132 may transition to NORMAL state 427. NORMAL state 427 represents the only state in which destination volume 132 accepts I/O.

Migration manager 110 may initiate a polling timer when destination volume 132 transitions to PR DONE state 425. Thereafter, migration manager 110 may monitor the state of destination volume 132. If destination volume 132 does not transition to NORMAL state 427 before the polling timer reaches a particular threshold or limit, migration manager 110 may transition destination volume 132 to MIGRATION ABORTED state 429 via state transition path 430.

If destination volume 132 transitions to NORMAL state 427 before an abort is triggered, multipath module 105 may configure the I/O path to destination volume 132 as the active path and start sending workload I/O via this path. Multipath module 105 may also return a success code to migration manager 110.

Migration manager 110 may pass initiator information, e.g., data transport information, to the host. The host may then may issue a vendor-specific SCSI command to provide initiator information to source volume 122. The initiator information may inform source volume 122, which is in its IN MIGRATION state 404, of white-listed initiators, i.e., initiators from which source volume 122 should allow I/O. White-listed initiators may include the data transport resource of destination volume 132. Commands from initiators other than white-listed initiators may be rejected by source volume 122 in the IN MIGRATION state 404.

The migration manager 110 may perform an API call into the destination array operating system to start the data transport process. If the data transport completes before any timeout, failure, or cancellation request occurs, the migration is completed and the destination volume may transition to DATA TRANSPORT COMPLETE state 431, in which the source volume may be torn down while the destination volume continues thereafter as the target volume for workload I/O.

The migration manager 110 may transfer/handle remaining portions of volume metadata, if any. For example, if the source array is configured with ongoing asynchronous replication, an XPR may be set up between destination volume 132, functioning as the source, and source volume 122. Details for such a sequence are described below. The user may wait for the completion of the CANCEL migration process.

Internal Abort of Path-Flip for the Start Migration Step.

As referenced previously, a recovery timer may be employed to avoid an I/O failure and/or application downtime, should the path-flip process require more than a particular interval of time, which may be more likely in a multi-host scenario. The internal abort attempts to restore source volume 122 as the active volume for workload I/O. The host needs to have distinct paths to source volume 122 and destination volume 132 to prevent data corruption in a multi-host case.

In at least one embodiment, if the recovery timer expires before polling of destination volume 132 confirms that destination volume 132 has transitioned to NORMAL state 427, the state of source volume 122 is determined. If multipath module 105 is unable to access source volume 122, it waits/retries until access is granted. While a timeout or failure is possible, such a timeout or failure may be determined and handled in the same manner as in a non-migration state or context.

If multipath module 105 is able to read the state of source volume 122 and source volume 122 is in the expected state, i.e., the IN MIGRATION state 404, the internal abort of path-flip proceeds and multipath module 105 reads the state of destination volume 132. If the state of destination volume 132 is not reachable, multipath module 105 resumes reading state of source volume 122 or otherwise idles until it obtains access to source volume 122, as well as destination volume 132.

If destination volume 132 is accessible and destination volume 132 is in PR DONE state 425 or EXPECT PR state 423, an attempt to abort the path-flip sequence and restore source volume 122 as the active volume is made. Multipath module 105 may send an ABORT MIGRATION command to destination volume 132 and destination volume 132 may accept the command if destination volume 132 is in either PR DONE state 425 or EXPECT PR state 423. Once the ABORT MIGRATION command is accepted and processed, destination volume 132 will reject all subsequent I/O operations. As a protective mechanism, migration manager 110 may be required to clean-up from this state, to prevent any hosts from performing I/O with destination volume 132.

In the event that destination volume 132 is accessible, but the ABORT MIGRATION command fails, the state of destination volume 132 may be read. If destination volume 132 is in NORMAL state 427, the immediately prior state of destination volume 132 was PR DONE state 425. In this situation, the attempt to abort the path-flip sequence may be terminated and the path-flip sequence resumed or re-initiated to establish destination volume 132 path as the active path.

If ABORT_MIGRATION is successful, this indicates that destination volume 132 has transitioned to MIGRATION ABORTED state 429, destination volume 132 will no longer accept I/O, and migration manager involvement is required to recover, which may include aborting, by the migration manager, the data transport process.

Once it has been ensured that destination volume 132 cannot accept I/O, a source volume 122 determination is made. Multipath module 105 may issue a LUN_OUT_MIG command 411 to source volume 122, which will succeed only if source volume 122 is in the IN MIGRATION state 404. If source volume 122 is in the IN MIGRATION state 404, source volume 122 will accept the LUN_OUT_MIG command and transition to NORMAL state 402. If source volume 122 is already in NORMAL state 402 when it receives the LUN_OUT_MIG command, the command still succeeds, albeit trivially, because source volume 122 is already out of the IN MIGRATION state 404. If source volume 122 is in any state other than IN MIGRATION state 404 or NORMAL state 402 when a LUN_OUT_MIG command is received, the command will be rejected.

If the LUN_OUT_MIG command succeeds, multipath module 105 may flip the active path back to source volume 122 and inform migration manager 110 that the path-flip failed. The migration manager 110 may perform polling to determine the path-flip status. Upon determining that the path-flip process failed, migration manager 110 may, with user inputs, proceed to clean-up source volume 122.

If the LUN_OUT_MIG command fails, then source volume 122 is not in NORMAL state 402 or IN_MIGRATION state 404. In such cases, further I/O must be prevented and user intervention is required because, not only has path-flip failed, it is no longer possible to restore source volume 122 as the active volume.

FIG. 4C illustrates information handling platform 100 when the destination volume 132 has transitioned to NORMAL state 427 (FIG. 4B) and data transport from source volume 122 is in progress via data transport path 135, while the active path 140 for workload I/O is a path from multipath module 105 to destination volume 132.

In some embodiments, the administrator may be given an option to issue a CANCEL command to cancel the migration process before the data transport completes. Migration cancellation may closely resemble the previously described path-flip sequence performed in reverse. Accordingly, migration cancellation may include two phases and may employ a recovery timer to signal a wayward cancelation process and thereby reduce the possibility of I/O failure.

Figure 5A:
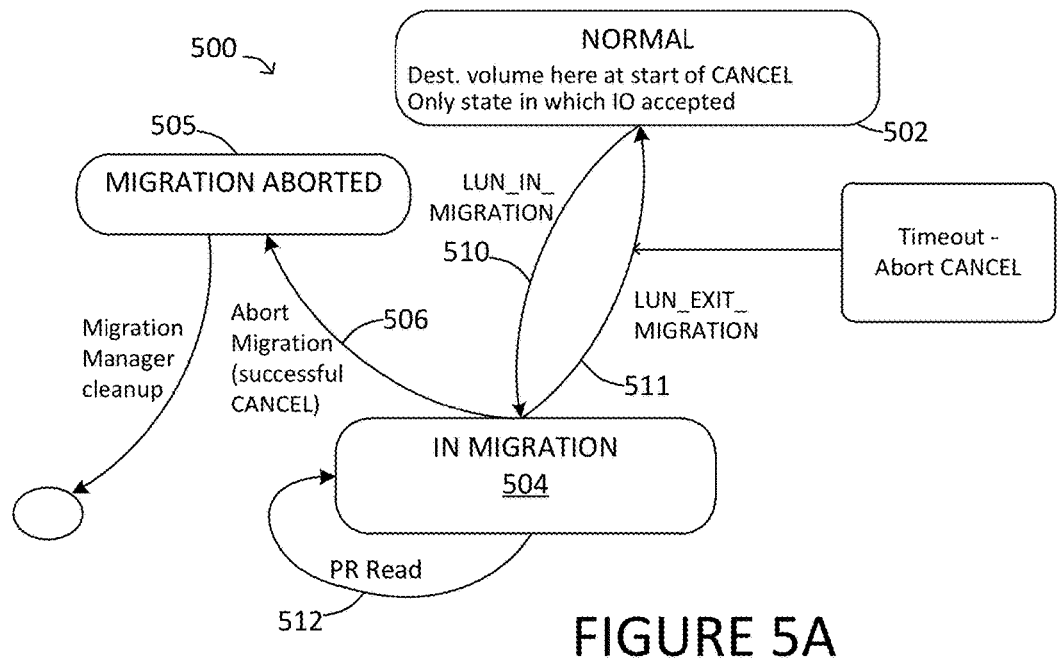
FIG. 5A is a state transition diagram of a source volume during a migration cancellation disclosed herein.
Figure 5B:
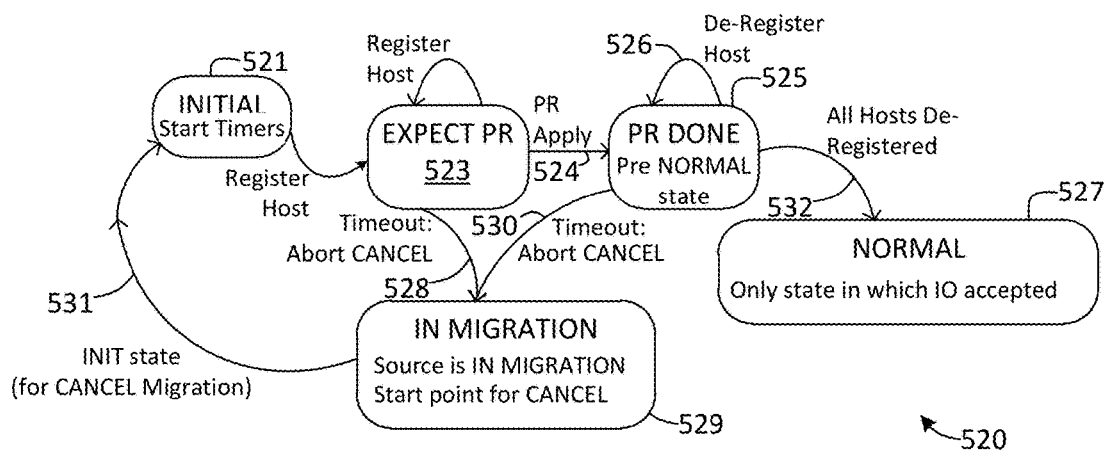
FIG. 5B is a state transition diagram of a target volume during a migration cancellation herein.

FIG. 5A and FIG. 5B illustrate cancellation state transition diagrams 500 for the source volume and state transition diagram 520 for the destination volume. For purposes of cancelling a migration that is in-progress, however, destination volume 132 functions as the source volume while source volume 122 functions as the destination volume.

Cancellation Phase 1.

In at least one embodiment of a cancellation Phase1, migration manager 110 may prompt each host and proceed to cancellation Phase2 only after receiving an acknowledgement or another suitable response from each of the cluster hosts.

At the start of cancellation Phase1, destination volume 132 is in NORMAL state 502, handling regular I/O and source volume 122 will be in the IN MIGRATION state 529. Multipath module 105 may issue a vendor-specific SCSI command to transition source volume 122 to INIT state 521 via state transition path 531. While source volume 122 remains in the INIT state 521, additional INIT commands that might be received, e.g., in a clustered environment, are treated as no-ops. Source volume 122 may be configured not to process I/O in the INIT state 521, or in any other state other than NORMAL state 527.

Multipath module 105 may then issue a HOST REGISTER command to source volume 122 and source volume 122 may register the corresponding host. The HOST REGISTER command transitions source volume 122 to the EXPECT_PR state 523. In multi-host configurations, each of the hosts may issue a corresponding HOST REGISTER command that is recorded by source volume 122. HOST REGISTER commands arriving after source volume 122 is in EXPECT PR state 523 do not cause a state transition.

Again, as was the case for the migration path-flip sequence, due to the lack of a Linux feature for recognizing a specific ASCQ, multipath module 105 of a Linux-based host may issue a SUSPEND_I/O command to block all I/O operations to destination volume 132. A SUSPEND I/O command may flush all outstanding I/O operations in the pipeline and prevent any new I/O operations from being issued. The SUSPEND I/O command may be omitted in VMware and Windows platform hosts.

As illustrated in FIG. 5A, multipath module 105 may start a recovery timer in INIT state 521 to identify a wayward cancellation process based on an unexpectedly long interval expiring without a transition from INIT state 521. If the recovery timer expires, an internal-abort-of-cancellation sequence may be triggered to restore normal I/O to destination volume 132 without causing or experiencing application down-time. The internal abort of the cancellation path-flip sequence may differ from the internal abort of the migration path-flip in one or more respects. For example, during internal abort of the cancellation path-flip, it may be desirable to leave source volume 122 in a state where the user has an option to retry the CANCEL operation.

At end of Cancellation Phase1, destination volume 132 will continue to be in 'NORMAL' state 502 and source volume 122 will be in EXPECT PR state 523 with I/O operations suspended to destination volume 132 suspended in Linux platforms.

Cancellation Phase 2.

Cancellation Phase2 resembles migration Phase 2 in reverse. The migration manager 110 initiates Phase 2 after receiving Phase 1 responses from each host. In Phase2, the host issues a vendor-specific LUN_IN_MIG command 510, which is a variant of a LUN RESET, to destination volume 132, which is functioning as the source volume. Destination volume 132 accepts the LUN_IN MIGRATION only if it is in NORMAL state 502. In response to receiving a LUN_IN_MIG command while in NORMAL state 502, destination volume 132 responds by aborting all outstanding I/Os across initiators and return a vendor-specific ASC/Q to all aborted and any subsequent I/O operations. Again, as was the case for migration Phase2, the first initiator request to destination volume 132 will also abort all outstanding I/O across the initiators to prevent a state transition of source volume 122 during PR transfer. So, the first initiator does a variant of LUN RESET to abort all outstanding I/O(s), across initiators.

Destination volume 132 transitions to IN MIGRATION state 504 in response to the LUN_IN_MIG command. In the IN MIGRATION state 504, destination volume 132 rejects incoming host I/Os and honors only a handful of vendor-specific commands.

In a multi-host case, where SM server initiates multiple cancellation Phase2 sequences simultaneously or closely in time, a host may have its I/O aborted with respect to destination volume 132 before its multipath module 105 completes its path-flip sequence. In such cases, multipath module 105 may queue I/O(s), which are failing from source volume 122 with a specific ASC/Q, in both Windows and VMware platform, until it gets an explicit 'clearance' from source volume 122. In Linux-based hosts, this issue does not arise due to the suspend I/O performed in cancellation PHase1.

Upon transitioning to IN MIGRATION state 504, new I/O to destination volume 132 is possible in non-Linux platforms since no I/O suspend has been executed. Any such new I/O may be queued by multipath module 105 upon arrival. Alternatively, new I/O may be sent to destination volume 132, which will reject the new I/O and return a specific ASC/Q to multipath module 105. MPIO may queue any such ASC/Qs received from destination volume 132. In Linux: since there is a suspend done in Phase-1, the host will generate no new I/O.

The host multipath module 105 may then issue a vendor-specific variant of a PR READ command to destination volume 132, which will allow the PR READ command while in the IN MIGRATION state 504 and respond by returning all PR metadata, including registration and reservation info, from each cluster host. A destination volume 132 that has no PR metadata will process a PR READ successfully, but will return no metadata or return an indication of no metadata to multipath module 105. No transition of state occurs as a result of PR READ 512. The transfer of PR metadata from destination volume 132 to source volume 122 that occurs during cancellation is necessary because the PR state of source volume 122 may have changed subsequent to last access of the PR metadata was read during migration Phase2.

Multipath module 105 may then send a vendor-specific variant of a PR APPLY command to source volume 122, which will accept the command only if in the EXPECT PR state 523. Any PR APPLY commands received by a source volume 122 in any state other than EXPECT PR will be treated as a no-op. Multipath module 105 transfers all PR metadata to source volume 122. The PR metadata may be structured as a blob that is processed and applied to source volume 122. The PR APPLY command triggers a transition 524 of source volume 122 from EXPECT PR state 523 to PR DONE state 525.

Multipath module 105 may then send a vendor-specific host deregistration command, HOST-MIG-DEREG command 526, to source volume 122. HOST-MIG-DEREG command clears source volume 122 of registration information for the applicable host. Source volume 122 may remain in the PR DONE state 525 until all host registration information is cleared, at which point, source volume 122 may transition to NORMAL state 527. NORMAL state 527 is only state in which source volume 122 may receive workload I/O.

Similar to the migration Phase1 and Phase2, multipath module 105 may initiate timers to trigger corrective action if the destination volume remains in the EXPECT PR state 523 or the PR DONE state 525 too long, i.e., longer than an appropriate threshold value for each state. With respect to PR DONE state 525, the source volume state may be polled periodically to determine whether the transition 532 from PR DONE state 525 to NORMAL state 527 has occurred. If a polling timer initiated by multipath module 105 when source volume 122 transitioned to PR DONE state 525 reaches a threshold value before transition 532 occurs, the cancellation path-flip is aborted and source volume 122 transitions to IN MIGRATION state 529.

If source volume 122 transitions to NORMAL state 527 within the allotted interval, the cancellation path-flip has succeeded. Before sending workload I/O to source volume 122 or making the path to source volume 122 active, multipath module 105 will prohibit I/O to destination volume 132 by issuing a vendor-specific SCSI command, ABORT MIGRATION, to destination volume 132. If destination volume 132 is in the IN MIGRATION state 504, the ABORT MIGRATION command will be accepted and trigger a state transition 506 of destination volume 132 from IN MIGRATION state 504 to MIGRATION ABORTED state 505. In a clustered implementation, a MIGRATION ABORTED command received after destination volume 132 has already transitioned to MIGRATION ABORTED state 505 is treated as a no-op. When destination volume 132 is in MIGRATION ABORTED state 505, I/O is prohibited and clean-up operations by migration manager 110 may be required.

After prohibiting I/O to destination volume 132, multipath module 105 will cancel the recovery timer, make the path to source volume 122 the active path, and start sending I/O to source volume 122. The migration manager 110 may poll a host to determine if the cancellation path-flip succeeds. If destination volume 527 achieves NORMAL state 527, multipath module 105 will return success to migration manager 110 to convey that the cancellation of the original migration was successful and that I/O operations to source volume 122 have been resumed. The migration manager 110 may then proceed to clean-up destination volume 132 and cancel the thin-import process.

If the recovery interval expires before source volume 122 transitions to NORMAL state 527, an internal abort of the cancellation path-flip is initiated in an attempt to avoid I/O failure and reinstate the migration process, migration manager 110 may provide the user with the option to retry the migration cancellation, preferably after resolving the issue.

The internal abort of the cancellation path flip may include multipath module 105 reading the state of destination volume 132. If multipath module 105 cannot access destination volume 132, it may wait and/or retry until access to destination volume 132 is achieved. I/O could timeout or otherwise fail, but as was the case for the internal abort of the migration path/flip described previously, an I/O failure of this type is not a migration-related failure and may be handled in the same manner as an I/O failure occurring in a non-migration context.

In one embodiment in which destination volume 132 is inaccessible but polling of source volume 122 returns successively, a path-flip may be performed instead of waiting on destination volume 132. In this particular embodiment, the path-flip restores the path to source volume 122 as the active path and the platform is effectively restored to the state prior to the initiation of the migration.

Returning to the internal abort of the cancellation path-flip, if destination volume 132 is accessible and in the expected state, an attempt to read the state of source volume 122 is made. If source volume 122 is not reachable, multipath module 105 may wait or retry by going back to reading the state of destination volume 132 such that multipath module 105 cannot proceed until the both volumes are accessible to the host.

If source volume 122 is reachable, and source volume 122 is in PR DONE state 525 or EXPECT PR state 523, the internal abort of the cancellation might be terminated since both volumes are in their expected states and neither volume is in a state in which it can accept I/O. In at least one embodiment, a CANCEL ABORT command may be sent to source volume 122. The source volume 122 will accept the CANCEL ABORT in EXPECT PR state 523 or PR DONE state 525, clear its host-migration registrations, and transition to IN MIGRATION state 529 along transition paths 528 and 529. With source volume 122 in IN MIGRATION state 529, the administrator may attempt to retry the cancellation of the migration.

If the CANCEL ABORT command fails, as could occur if a stuck host recovers and clears its migration-registration information, the state of source volume 122 is read. If source volume 122 is in NORMAL state 527, this implies that the prior state of source volume 122 was PR DONE state 525. Accordingly, a path-flip may be performed to make the path to source volume 122 the active volume.

If the CANCEL ABORT executes successively, source volume 122 has transitioned to IN MIGRATION state 529 along transition path 528 or 530. When destination volume 132 is in MIGRATION ABORTED state 505, the administrator has re-tried the migration cancellation CANCEL operation and a late arriving host, cannot make PS LUN (DST) into normal state.

Having ensured that source volume 122 cannot accept I/O in the IN MIGRATION state 529, an attempt to establish destination volume 132 as the active volume may be made. Establishing destination volume 132 as the active volume may include sending a LUN OUT MIG command to destination volume 132. The LUN_OUT_MIG command will succeed only if destination volume 132 receives the command while in IN MIGRATION state 504, in which case the command will transition destination volume 132 from IN MIGRATION state 504 to NORMAL state 502 along state transition path 511. Strictly speaking, if destination volume 132 is already in NORMAL state 502 when a LUN OUT MIG arrives, the LUN OUT MIG will complete successfully, but no state transition occurs. If LUN OUT MIG succeeds, destination volume 132 is in NORMAL state 502 and a path-flip may be performed to configure the path to destination volume 132 as the active path and resume I/O, while declaring that the migration cancellation has failed.

Migration manager 110 may poll information handling platform 100 to detect or otherwise the path-flip status and thereby learn that the cancellation path-flip has failed, in which case I/O continues to destination volume 132 and the administrator has the option to retry the migration cancellation.

If the LUN OUT MIG command fails, then destination volume 132 is not in NORMAL state 502 or IN MIGRATION state 504. Under such circumstances, I/O must be prohibited and user intervention is required because the migration cancellation path-flip has failed, but destination volume 132 cannot be restored as the active volume.

The administrator may intend to destroy source volume 122, and all other volumes on source array 120, after the migration of source volume 122 and all other volumes on source array 120 completes, in which case the administrator could power-down source array 120. Regular access to source volume 122 should be prohibited under such circumstances.

In at least one embodiment, all migration commands of storage management server 108 comply with a two-phase commit protocol and all in-band SCSI commands are idempotent. For example, a LUN IN MIGRATION command issued to a LUN that is already in the IN MIGRATION state functions as a no-op that terminates successively.

When multipath module 105 reboots, it will issue a vendor-specific VPD (C5) to source array 120 and destination array 130. Migrated volumes on destination array 130 may indicate themselves as such with a message such as 'EQL VPD-83-Information' along with volume-name. This is used by multipath module 105 to know which top-tier device is to be exported, which, for example, is relevant for Linux Platform.

Firmware of source array 120 may store migration states including, as examples, REGULAR, IN MIGRATION, MIGRATION DONE in a management information base or other form of persistent storage. Information handling platform 100 may include one or more interfaces enabling applications to access this state information. In addition, an operating system of destination array 130 may store information for volume(s) 122 and this information can be accessed via vendor-specific commands.

In some embodiments, the Phase1 and Phase2 portions of the seamless migration described with respect to FIGS. 2A, 2B, 3A, 3B, 4A, 4B, 5A, and 5B may differ from the Phase1 and Phase2 described above. In at least one such embodiment, modifications of the modified Phase1 and Phase2 may employ fewer vendor-specific SCSI commands and simpler state machines. In addition, modified Phase1 and Phase2 embodiments may be platform agnostic whereas the sequences described above included at least some platform-specific considerations.

Referring now to FIG. 6, a Phase1 sequence 601 and Phase2 sequence 621 are illustrated. In the Phase1 sequence 601 illustrated in FIG. 6, migration manager 110 issues HOLDIO commands 603 to each host in a cluster and starts (604) an abort timer. Upon successful completion of the HOLDIO, multipath module 105 reports (605) completion of Phase1 The migration manager 110 waits (606) for each host to complete Phase1 before proceeding. The Phase1 sequence illustrated in FIG. 1 omits the vendor-specific INIT and HOST MIGRATION REGISTRATION commands described previously.

In the Phase2 sequence 621 illustrated in FIG. 6, the migration manager 110 sends a C5 DISABLE command 607 to source array 120 before sending a PR COPY command 609 to each host in the cluster. Multipath module 105 for each host then sends an SU PR IN command 611 to source array 120 and an SU PR OUT command 613 to destination array 130 to copy PR information from source array 120 to destination array 130 for each host. Multipath module 105 may then poll 615 the status of destination volume 132 and report (616) completion of Phase2 for the host if a NORMAL status is detected. If destination volume 132 reports a status other than NORMAL, Phase1 may be aborted. Migration manager 110 waits (617) for each host to successfully complete Phase2. The Phase 2 sequence of FIG. 6 thus omits the LUN IN MIGRATION and DEREGISTRATION commands of the previously described Phase2 as well as the passing of white-listed initiators from multipath module 105 to source array 120.

Figure 7:
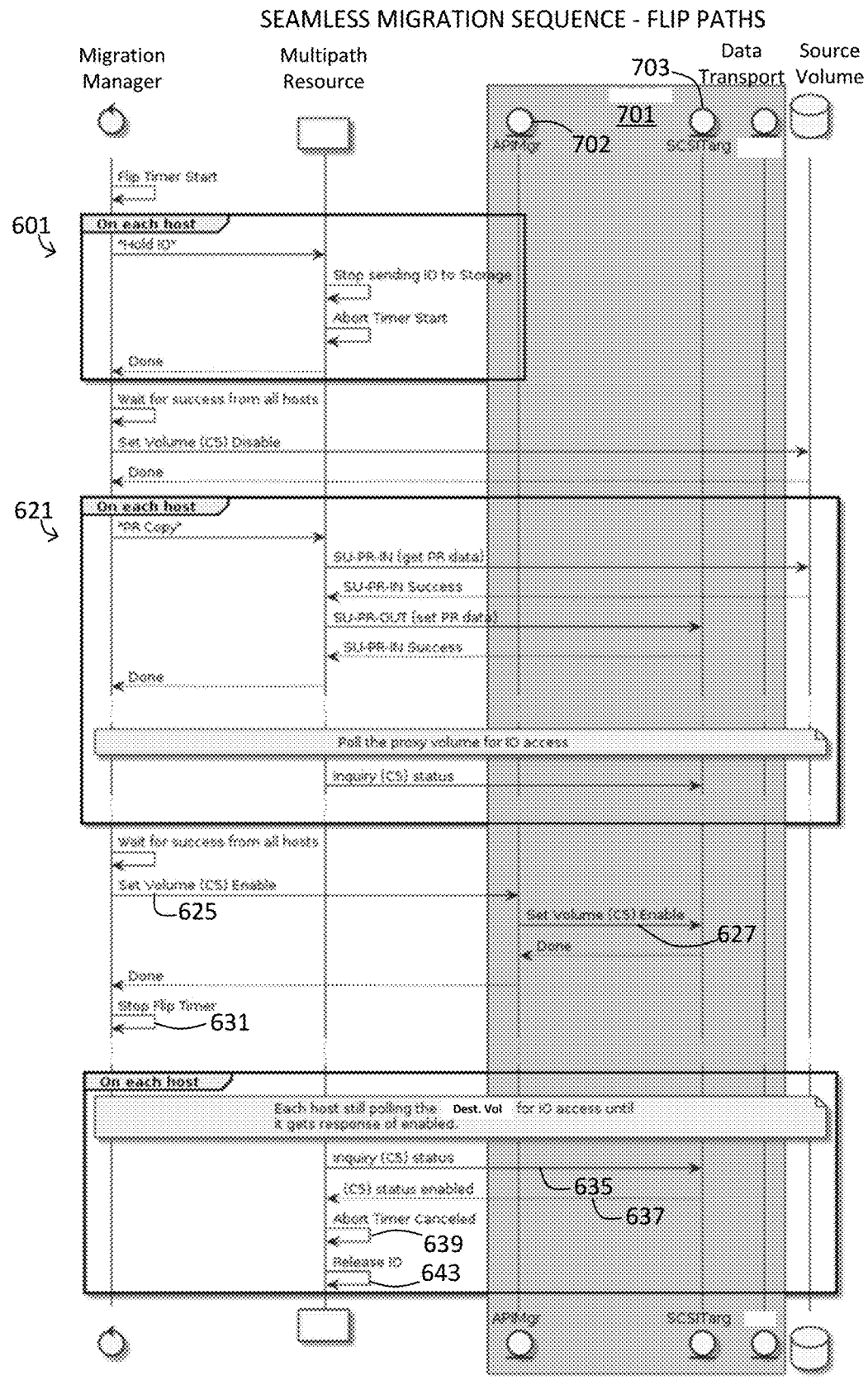
FIG. 7 illustrates stages of an alternative data migration process.

Referring now to FIG. 7 a sequence diagram illustrates a path flip sequence 700. An analogous sequence occurs during a "flipping back" resulting from a cancel request with the destination volume and source volumes reversing roles. The path flip sequence 700 illustrated in FIG. 7 includes the Phase1 sequence 601 and the Phase2 sequence 621 described with respect to FIG. 6. After migration manager 110 confirms that each host successfully completes Phase2 621, migration manager 110 may send a volume enable, sometimes referred to as a C5 enable 625, to destination volume 132. The C5 ENABLE 625 illustrated in FIG. 7 is implemented as a call to an API resource 702 of a storage operating system 701 associated with destination array 130. API resource 702 forwards (627) the ENABLE to the appropriate volume, i.e., SCSI target 703. When the SCSI target 703 has responded to the C5 ENABLE from API resource 702 and API resources has responded to C5 ENABLE 625, a path-flip time that was initiated prior to Phase1 is stopped (631).

Once the migration manager 110 has enabled destination volume 132, each host may send a C5 status inquiry 635 to the SCSI target 703. Upon receiving a status enabled response 637, multipath module 105 may cancel (639) an abort timer that was initiated (641) during Phase1 601 and release (643) the applicable host for I/O.

Figure 8:
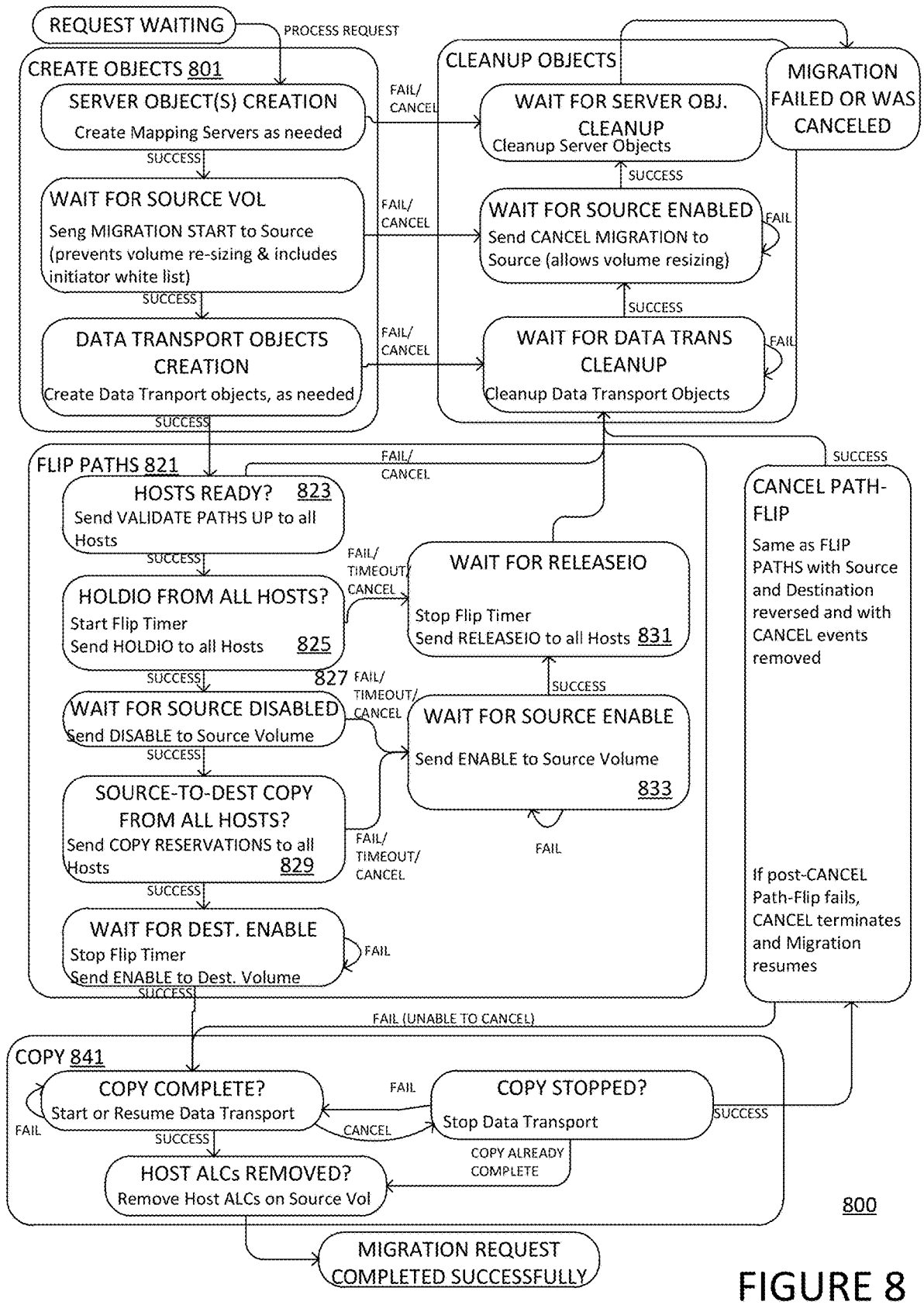
FIG. 8 illustrates a state transition diagram for a migration manager disclosed herein.

FIG. 8 illustrates a state diagram 800 for migration manager 110. The state diagram 800 illustrated in FIG. 8 includes an object creation state 801 in which migration manager 110 may create mapping servers, send a START MIGRATION command, and create data transport objects including, as an example, Thin Import object.

Migration manager 110 may then transition to a flip paths state 821 in which all host paths are validated (block 823) before starting a flip timer and sending a HOLD I/O to all hosts (block 825) and disabling (block 827) the source volume 122. After disabling source volume 122, persistent reservation information may be copied (block 829) from source volume 122 to target volume 132. If the persistent reservation information is successfully copied to the destination volume, the destination volume may be enabled before transitioning to the data copy stage 841.

The migration manager state diagram 800 of FIG. 8 includes a transition from block 825 to block 831 that is triggered by a timeout, failure, or cancellation initiated before migration manager transitions to block 827. In block 831, the migration is aborted by issuing ReleaseIO commands to all hosts. The Release I/O is sufficient to restore the source volume as the active volume because the migration had not advanced to the point where the volume had been disabled (as in block 827).

If a failure, timeout or cancellation occurs while the migration manager is pending in block 827, a transition to block 833 occurs to restore the source volume as the active volume. In block 833, the source volume is enabled before proceeding to the previously described block 831, in which each of the hosts is instructed to release I/O.

If a failure, timeout, or cancellation occurs while the migration manager is pending in block 829, a transition to block 833 occurs and the migration is canceled by enabling the source volume and instructing each host to release I/O.

Once a data transport is initiated in state 341, a cancellation request, if successfully acknowledged, will initiate a path-flip analogous to the sequence involving blocks 823 through 833 with the source volumes and target volumes reversed and without an option for cancelling.

Figure 9A:
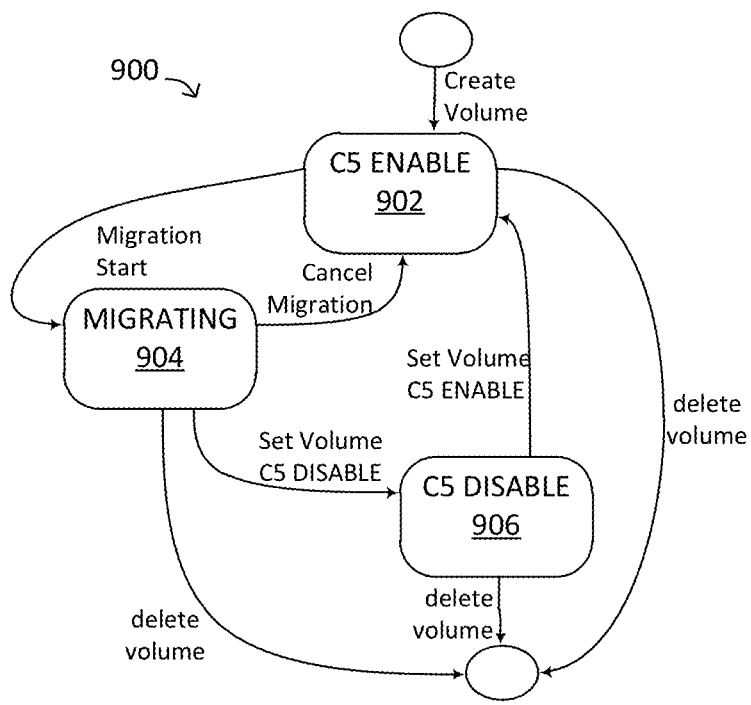
FIG. 9A illustrates a state transition diagram for a source volume of a data migration process.

FIG. 9A illustrates a data migration state transition diagram 900 for the source volume. The state transition diagram 900 illustrated in FIG. 9 includes three states in which the source volume may reside during a migration. A source volume for a migration is created in the C5 ENABLE state 902. The source volume may transition to MIGRATING state 904 in response to a Start Migration instruction from the migration manager. From MIGRATING state 904, the source volume may transition back to C5 ENABLE state 902 in response to a Cancel Migration request from an administrator or other user. The source volume may also transition to the C5 DISABLED state 906 in response to a Set Volume C5 DISABLE instruction from the migration manager. The source volume may transition from C5 DISABLED state 906 to C5 ENABLED state 902 in response to a Set Volume C5 enable instruction.

In at least one embodiment, a source volume that is in the C5 DISABLE state may process selected SCSI commands while all other SCSI commands terminate or fail. The selected SCSI commands include, in at least one seamless migration example, an Inquiry command, a Test Unit Ready command, a Report-LUNs command, and specialized PR commands referred to herein as super-user or SU_PR commands, including an SU_PR_IN command and an SU_PR_OUT command.

The SU_PR commands may be used as part of previously describe path flip processes. An SU_PR command may execute precisely as a corresponding normal PR command executes. However, the SU_PR command may have a different command opcode than its corresponding PR command. The difference in command opcode enables the source volume to differentiate between PR commands during normal I/O operations and PR commands during migration. The multipath module that executes the path flip may be configured to employ the C5 DISABLE state and the SU_PR commands to support seamless migration without exposing the data in the storage elements to inadvertent or malicious corruption or loss.

A source volume in C5 ENABLED state 902 may respond to all SCSI commands normally. By issuing an Inquiry C5, a host may determine wither the applicable resource is in C5 ENABLED state 902 or C5 DISABLED STATE 906. In at least some embodiments, MIGRATING state 904 is considered an ENABLED state. The C5 ENABLE state 902 and the MIGRATING state 904 may function substantially identically except that volume resizing may be prohibited in MIGRATING state 904.

Figure 9B:
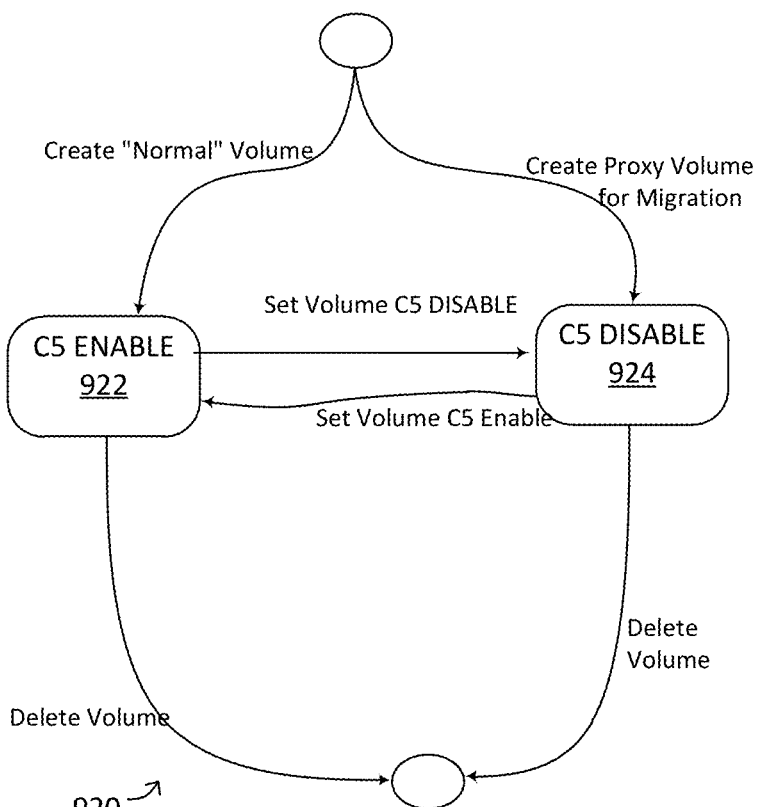
FIG. 9B illustrates a state transition diagram for a target volume of a data migration process.

FIG. 9B illustrates a state transition diagram 920 for the target volume in migration. The state transition diagram 920 illustrated in FIG. 9B includes a C5 ENABLE state 922 and a C5 DISABLE state 924. When a normal volume is created, the volume originates in C5 enable state 922. When the migration manager creates a proxy volume for migration, the proxy volume originates in C5 DISABLE state 924. A target volume in C5 ENABLE state 922 transitions to C5 DISABLE state 924 in response to a Set Volume C5 DISABLE command. Conversely, a target volume in the C5 DISABLE state 924 transitions to C5 ENABLE state 922 in response to a Set Volume C5 ENABLE command.

Again, as in FIG. 9A, a volume in C5 DISABLE state 924 may process selected SCSI commands while rejecting all others. In one embodiment, the commands processed by a target volume in the C5 DISABLE state 924 include the Inquiry command, a Test Unit Ready command, A Report LUNs command, and SU_PR commands including SU_PR_IN and SU_PR_OUT. It will be noted that there is no MIGRATING state in the state transition diagram 920 for the target volume, since the target volume is always a migration destination.

A volume that has a proxy volume associated with it should not allow size changes. After a migration completes, the proxy volume will be gone and a resize of the normal volume can be allowed.

Any one or more processes or methods described above, including processes and methods associated with the flow diagrams and state transition diagrams of FIGS. 2A and 2B through FIGS. 9A and 9B, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. IHSs may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. A data management method for migrating a data volume from a source array to a destination array, the method comprising:
responsive to receiving an indication of a source volume to migrate from the source array to the destination array, initiating a migration process, wherein the source volume comprises a clustered volume associated with a plurality of cluster hosts, and wherein the migration process, includes:
creating a proxy volume on the destination array;
connecting the proxy volume to the source volume;
mapping the proxy volume to the cluster hosts;
requesting one or more of the cluster hosts to build a passive path to the proxy volume; and
initiating a path-flip process, wherein the path-flip process includes:
instructing the cluster hosts to suspend input/output (I/O) operations and, responsive to detecting an exception before the cluster hosts successfully suspend I/O;
instructing the cluster hosts to release I/O; and
terminating the migration process;
disabling the source volume and, responsive to detecting an exception before the source volume is disabled successfully:
sending a volume enable to the source array;
instructing each the cluster hosts to release I/O; and
terminating the migration process;
instructing the cluster hosts to perform registration copy operations to apply source volume host registrations to a destination volume of the destination array and, responsive to detecting an exception before the registration copy operations complete successfully:
sending a volume enable to the source volume;
instructing the cluster hosts to release I/O; and
terminating the migration process;
sending a volume enable to the destination volume; and
responsive to detecting a destination volume status of enabled from each of the cluster hosts, copying the source volume to the destination volume.

2. The method of claim 1, wherein said detecting an exception comprises detecting at least one of: a timeout event, a command failure, and a migration cancellation request.

3. The method of claim 2, further comprising, initiating a path-flip timer before instructing the cluster hosts to suspend I/O, wherein detecting a timeout event includes detecting the path-flip timer exceeding a path-flip threshold before the path-flip process completes.

4. The method of claim 2, further comprising, initiating an abort timer after instructing the cluster hosts to suspend I/O, wherein detecting a timeout event includes detecting the abort timer exceeding an abort threshold value before completing the path-flip process.

5. The method of claim 1, further comprising, responsive to detecting a cancel request during said copying, performing a reverse path-flip process comprising the path-flip process with the source volume serving as the destination volume and vice versa.

6. The method of claim 5, responsive to a time out or failure during the reverse path-flip process, terminating the reverse path-flip process and resuming the copying.

7. The method of claim 1, wherein instructing each of the cluster hosts to suspend I/O includes instructing at least one cluster host to execute a vendor-specific host register command.

8. The method of claim 1, wherein configuring each cluster host to suspend I/O includes issuing hold I/O instructions to each cluster host.

9. The method of claim 1, wherein disabling the source volume includes sending a small computer system interface (SCSI) disable command.

10. The method of claim 1, wherein disabling the source volume includes sending a vendor-specific in-migration command from each cluster host to the source volume.

11. The method of claim 1, wherein the source array is of a different type of storage array than the destination array.

12. The method of claim 11, wherein an operating system of the source array differs from an operating system of the destination array.

13. The method of claim 11, wherein the source array maintains a one-to-one correspondence between iSCSI targets and logical unit numbers (LUNs) and wherein the destination array supports a one-to-many relationship between iSCSI targets and storage volumes.

14. An information handling system comprising:
a processor; and
a computer readable storage medium including stored instructions that, when executed by the processor, cause the processor to perform operations comprising:
responsive to receiving an indication of a source volume to migrate from a source array to a destination array, wherein the source volume comprises a clustered volume including a plurality of cluster hosts, initiating a migration process, wherein the migration process includes:
initiating a path-flip process, wherein the path-flip process includes:
initiating a path-flip timer;
instructing the cluster hosts to suspend input/output (I/O) operations and, responsive to detecting an exception before each cluster host successfully suspends I/O, operations:
instructing each cluster host to release I/O; and
terminating the migration process;
initiating an abort timer;
disabling the source volume and, responsive to detecting an exception before said disabling completes:
sending a volume enable to the source array;
instructing the cluster hosts to release I/O; and
terminating the migration process;
instructing the cluster hosts to perform registration copy operations to apply source volume host registrations to a destination volume of the destination; array and, responsive to detecting an exception before the registration copy operations complete:
sending a volume enable to the source volume;
instructing each cluster host to release I/O; and
terminating the migration process;
sending a volume enable to the destination volume; and
responsive to detecting a destination volume status of enabled from each of a plurality of cluster hosts, copying the source volume to the destination volume;
responsive to detecting a cancel request during said copying, performing a reverse path-flip comprising the path-flip process with the source volume serving as the destination volume and vice versa; and
responsive to detecting an exception during the reverse path-flip, terminating the reverse path-flip and resuming the copying;
wherein detecting an exception includes detecting a timeout event and wherein detecting a time event includes:
detecting the path-flip timer exceeding a path-flip threshold value before the path-flip process completes; and
detecting the abort timer exceeding an abort threshold value before the path-flip process completes.

15. The information handling system of claim 14, wherein configuring each cluster host to suspend I/O includes instructing at least one cluster host to execute a vendor-specific host migration register command.

16. A non-transitory computer readable medium including processor-executable instructions that, when executed by a processor, cause the processor to perform operations comprising:
responsive to receiving an indication of a source volume to migrate from a source array to a destination array wherein the source volume comprises a clustered volume including a plurality of cluster hosts, initiating a migration process, wherein the migration process includes:
initiating a path-flip: process, wherein the path-flip process includes:
initiating a path-flip timer;
instructing the cluster hosts to suspend input/output (I/O) operations and, responsive to detecting an exception before each cluster host successfully suspends I/O operations:
instructing each cluster host to release I/O; and
terminating the migration process;
initiating an abort timer;
disabling the source volume; and, responsive to detecting an exception before said disabling completes:
sending a volume enable to the source array;
instructing the cluster hosts to release I/O; and
terminating the migration process;
instructing the cluster hosts to perform registration copy operations to apply source volume host registrations to a destination volume of the destination; array and, responsive to detecting an exception before the registration copy operations complete:
sending a volume enable to the source volume;
instructing each cluster host to release I/O; and
terminating the migration process;
sending a volume enable to the destination volume; and
responsive to detecting a destination volume status of enabled from each of a plurality of cluster hosts, copying the source volume to the destination volume;
responsive to detecting a cancel request during said copying, performing a reverse path-flip comprising the path-flip process with the source volume serving as the destination volume and vice versa; and
responsive to detecting an exception during the reverse path-flip, terminating the reverse path-flip and resuming the copying;
wherein detecting an exception includes detecting a timeout event and wherein detecting a time event includes:
detecting the path-flip timer exceeding a path-flip threshold value before the path-flip process completes; and
detecting the abort timer exceeding an abort threshold value before the path-flip process completes.

17. The non-transitory computer readable medium of claim 16, wherein configuring each host to suspend I/O includes instructing at least one host to execute a vendor-specific host migration register command.

* * * * *